Sept. 20, 1971 YOSHIO TAWARA ET AL 3,605,259

METHOD OF MANUFACTURING A PAIR OF POLE PIECES
FOR A MAGNETIC HEAD
Filed Feb. 26, 1969

YOSHIO TAWARA,
YASUMASA KOMATSU,
AND HOZUMI HIROTA

INVENTORS

BY

Wenderoth, Lind & Ponack
ATTORNEYS

United States Patent Office 3,605,259

Patented Sept. 20, 1971

3,605,259

METHOD OF MANUFACTURING A PAIR OF POLE PIECES FOR A MAGNETIC HEAD

Yoshio Tawara and Yasumasa Komatsu, Osaka-fu, and Hozumi Hirota, Nara-ken, Japan, assignors to Matsushita Electric Industrial Co., Ltd., Osaka, Japan Filed Feb. 26, 1969, Ser. No. 802,409

Claims priority, application Japan, Mar. 6, 1968, 43/15,007

Int. Cl. H01f 7/06

U.S. Cl. 29—603 2 Claims

ABSTRACT OF THE DISCLOSURE

A pair of pole pieces having a magnetic head which have tips of a magnetic alloy with a spacer of non-magnetic metal between the tip end portions of said tips for forming a non-magnetic gap. The pole pieces are formed by grooving the flat surfaces of two magnetic alloy bars, depositing a non-magnetic metal film on the flat top surfaces of the bars and wetting the inside of the grooves with a soldering material. The thus prepared bars are brought together due to the flat surfaces abutting each other and then the soldering material is heated so as to adjoin the abutting bars. The thus joined bars are cut along a plane perpendicular to the abutting surfaces of the bars and then each of the cut surfaces is cut along a plane perpendicular in longitudinal axes of the parts to produce a plurality of pairs of pole pieces.

This invention relates to a pair of pole pieces for use in a composite type magnetic head and a method of manufacturing such a pair of pole pieces.

A conventional composite type magnetic head comprises a pair of pole pieces having a non-magnetic gap between them, and a ferrite yoke which has a winding thereon.

In such a conventional magnetic head, the pair of pole pieces are joined together, for example, by an organic adhesive such as epoxy, and the construction is not sufficiently strong to maintain the non-magnetic gap over a long period of time in which the pole pieces are in an intimate contact with a tape running at a high speed. A conventional method for making such a conventional pair of pole pieces comprises shaping a body of magnetic alloy so that it has a form corresponding to that of a tip of a pair of pole pieces, and then joining two shaped bodies into a magnetic head comprised of a pair of pole pieces by using an organic adhesive. This method requires a lot of manual labor.

An object of the invention is to provide a pair of pole pieces for composite magnetic head assembly, said pair of pole pieces being joined by a soldering material adhered thereto and having high strength, the pole pieces being positioned to define a magnetic gap therebetween.

Another object of the invention is to provide an easy method of manufacturing pole pieces which is suitable for mass production.

Figure 1:
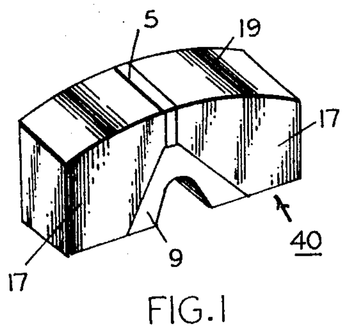
Figure 2:
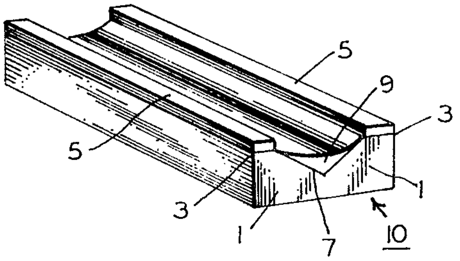
Figure 3:
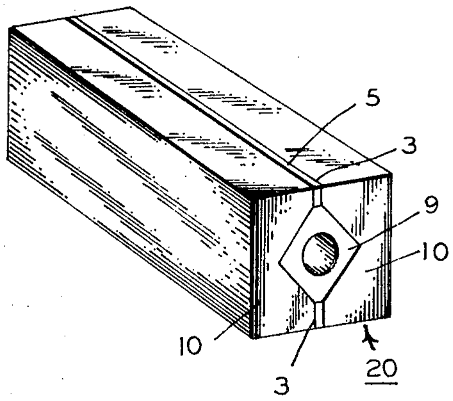
Figure 4:
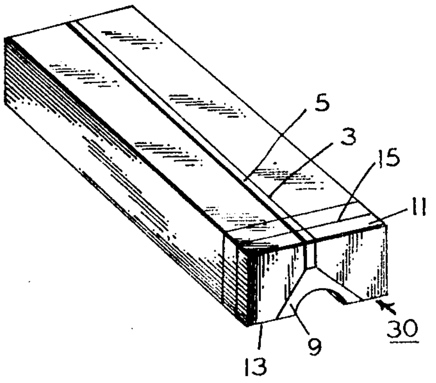

The features and advantages of this invention will become apparent from the following description taken in conjunction with the accompanying drawings in which:

FIG. 1 is a perspective view of a pair of pole pieces according to the invention; and FIGS. 2 to 4 illustrate stages in the manufacture of a pair of pole pieces as shown in FIG. 1, FIG. 2 being a perspective view of a bar provided with a V-shaped groove which is to be formed in the pole pieces, FIG. 3 being a perspective view of joined bars, and FIG. 4 being a perspective view which illustrates the manner of cutting the joined bars of FIG. 3 to obtain many pairs of pole pieces.

Referring to FIG. 1, reference character 40 designates, as a whole, a pair of pole pieces comprised of two tips 17 made of a magnetic alloy. The portions of said two tips 17 remote from the end portions thereof are joined together by a solder material 9 so as to define between the tip end portions of the tip 17 a non-magnetic gap filled by a non-magnetic metal film 5 deposited therein. Said tips 17 have a curved surface 19 which serves as a guide surface for a magnetic tape. To complete the composite magnetic head, a magnetic yoke (not shown) is placed across the ends of the tips 17 remote from the tip end portions, and a winding (also not shown) is placed around said yoke.

It has been discovered according to the invention that a high permeability magnetic alloy having the composition as set forth hereinafter can be soldered by a conventional solder material such as Pb-Sn alloy solder. The magnetic alloy has a composition consisting essentially of:

Fe=12 to 16 mol percent, Co=55 to 60 mol percent, B=19 to 23 mol percent.

Sn=0 to 5 mol percent, Al=0 to 6 mol percent.

By employing such a magnetic alloy for the tips 17, the novel construction of the pair of pole pieces shown in FIG. 1 can be achieved in accordance with the invention.

The construction shown in FIG. 1 is achieved by the following steps: A first alloy bar 10, formed of the alloy set forth hereinbefore, and having at least one flat surface, has a groove 7 formed in said flat surface. The cross section of said groove 7 can be any suitable concave shape, such as V-shape or U-shape. The groove is formed by any suitable and available machining technique so as to leave a pair of shoulders 1 on opposite sides of said groove 7, said shoulders 1 each having a flat top surface 3 thereon. Said pair of shoulders are straight and parallel to each other. The flat top surfaces 3 of said pair of shoulders 1 are coated with a film 5 of a non-magnetic metal, which is to serve as a spacer in the finished product, by any available and suitable technique, such as vacuum evaporation or electrolytic plating. Said non-magnetic metal films 5 can be of any non-magnetic metals or alloys such as aluminum, copper, silver or titanium. The inside of the groove 7 is wetted with any suitable and available conventional solder material 9 which has a melting point lower than the metal of the film 5.

A second grooved alloy bar 10 is formed and has the solder material deposited in the groove therein, but no metal film is deposited on the flat top surfaces 3. The two bars 10 are joined by placing the flat surfaces 3, one pair with the metal films 3 thereon and the other pair without, against each other and holding them in position by any available and suitable holding tool. The two bars are joined together securely by heating the solder material 9 to form a body 20, as shown in FIG. 3.

The body 20 is then cut into two parts along a plane 13 perpendicular to the abutting faces 3 to form two identical blanks 30, one of which is shown in FIG. 4. Each of the two blanks 30 is then sliced into pieces 11 along planes 15 perpendicular to the longitudinal axis of the blank. The sliced pieces 11 are then shaped into the desired form shown in FIG. 1 suitable for pole pieces.

It will be seen that this method is simple, and because all of the steps can be carried out by conventional machinery and conventional techniques, and because a large number of pairs of pole pieces can be produced from one body 20, the method is readily adaptable for mass production of pairs of pole pieces according to the invention.

What is claimed is:

1. A method of manufacturing a pair of pole pieces for a composite magnetic head, comprising the steps of: grooving a flat surface of each of two magnetic alloy bars so as to leave a pair of shoulders on the opposite sides of the grooves, each of the shoulders having a flat top surface thereon and said shoulders being straight and parallel to each other; carrying out a vacuum depositing step for depositing a non-magnetic metal film having a thickness equal to the non-magnetic gap dimension on the flat surfaces of the pair of shoulders of only one bar; wetting the inside of the grooves in each bar with a soldering material with a melting point lower than that of the non-magnetic metal of said film; bringing the two grooved and wetted alloy bars together with the flat surfaces abutting each other with the non-magnetic metal film between the flat surfaces; heating said solder material contained in the grooves to a temperature sufficient to cause said solder to flow and join said abutting bars; cutting the joined bars along a plane perpendicular to the abutting flat surfaces to form two sections, each having the cross-section of a pair of pole tips with a non-magnetic gap therebetween; and slicing each along parallel planes perpendicular to the longitudinal axes of said sections to form individual pairs of pole pieces.

2. A method as claimed in claim 1 wherein said magnetic alloy consists essentially of 12 to 16 mol percent Fe, 55 to 60 mol percent Co, 19 to 23 mol percent B, 0 to 5 mol percent Sn and 0 to 6 mol percent Al.

References Cited

UNITED STATES PATENTS

| | | | |
|---|---|---|---|
| 2,706,752 | 4/1955 | Dupy. | |
| 3,049,790 | 8/1962 | Camras | 29—603 |
| 3,126,615 | 3/1964 | Duinker | 29—603 |

JOHN F. CAMPBELL, Primary Examiner

C. E. HALL, Assistant Examiner

U.S. Cl. X.R.

179—100.26